United States Patent Office 3,082,232
Patented Mar. 19, 1963

3,082,232
PREPARATION OF ORGANOMETALLIC MONOHALIDES
Gene Nowlin, Glen Burnie, Md., and Harold D. Lyons, Bartlesville, Okla., assignors to Phillips Petroleum Company, a corporation of Delaware
No Drawing. Filed Nov. 28, 1955, Ser. No. 549,520
18 Claims. (Cl. 260—448)

This invention relates to the preparation of organometallic monohalides. In one aspect, the invention relates to the preparation of alkyl-, cycloalkyl-, and arylaluminum monohalides and similar compounds of the metals of gallium, indium and thallium.

Organometallic monohalides are very useful materials in the synthesis of various types of organic compounds. For example, diethylaluminum chloride can be advantageously utilized in the preparation of triethylaluminum. The organometallic monohalides prepared in accordance with this invention can also be employed as components of catalyst systems used in the polymerization of monoolefins.

It is an object of this invention to provide an improved process for preparing organometallic monohalides.

Another object of the invention is to provide a method for preparing alkyl-, cycloalkyl-, and arylaluminum monohalides and similar compounds of the metals gallium, indium and thallium from the corresponding organometallic dihalide.

Other and further objects and advantages of this invention will become apparent to those skilled in the art upon consideration of the accompanying disclosure.

An organometallic dihalide can be converted to the monohalide by treatment with a metal such as the alkali metals, calcium, magnesium or zinc. This reaction when magnesium is used can be represented by the following general equation:

$$4RMX_2 + 3Mg \rightarrow 2R_2MX + 3MgX_2 + 2M \quad (1)$$

In this equation, R is an alkyl radical, a cycloalkyl radical, an aryl radical or combinations of these radicals, e.g., aralkyl or alkaryl radicals, M is a metal selected from the group consisting of aluminum, gallium, indium and thallium, and X is a halogen, including chlorine, fluorine, bromine and iodine. It is noted that in this reaction a portion of the metal originally present in the organometallic dihalide is not utilized in the production of the monohalide but appears among the reaction products as free metal.

We have now discovered that by carrying out the reaction represented by the above equation in the presence of an organic halide, all of the metal originally present in the organometallic dihalide is converted into the organometallic monohalide. Broadly speaking, the process of this invention comprises reacting an organometallic dihalide with a metal selected from the group consisting of alkali metals (including sodium, potassium, lithium, rubidium and cesium), magnesium, calcium and zinc in the presence of an organic halide. This reaction when using magnesium can be represented by the following equation $$RMX_2 + Mg + RX \rightarrow R_2MX + MgX_2 \quad (2)$$

wherein R, M and X are as defined hereinabove with relation to Equation 1.

When practicing the process of this invention, the metal reacted with the organometallic dihalide in the presence of the organic halide can be conveniently employed as a finely divided dispersion in a hydrocarbon. The dispersed metal usually has a particle size of less than 300 microns, with a size between 10 and 100 microns being preferred. Dispersions of the alkali metals, magnesium, calcium or zinc can be prepared by any known means such as by heating and stirring a mixture of the metal and hydrocarbon. It is preferred that the hydrocarbon have a boiling point higher than the melting point of the alkali metal for convenience in preparing the dispersion. When magnesium, calcium and zinc are used, they are usually employed as powders and are suspended in the hydrocarbon by any suitable means, such as by stirring or shaking, passing through a colloid mill, or grinding a paste of the metal and hydrocarbon on an ink or pigment mill and then adding the desired quantity of hydrocarbon.

Hydrocarbons which are preferred are those which have a boiling point above the boiling point of the product of the reaction in order to facilitate separation of the product from the total reaction mixture. Suitable hydrocarbons for use in the process include paraffins, cycloparaffins and/or aromatic, which are relatively inert, non-deleterious and liquid under conditions of the process. Examples of hydrocarbons which can be employed are the octanes, the nonanes, the decanes, the hexadecanes, the octadecanes, cyclohexane, methylcyclohexane, benzene, toluene, xylene and the like. Mixtures of any two or more of these hydrocarbons can be used in the process of this invention.

The organometallic dihalide used as the starting material can be conveniently obtained by reacting an organic halide with one of the metals aluminum, gallium, indium and thallium. This reaction can be expressed by the following general equation $$3RX + 2M \rightarrow R_2MX + RMX_2 \quad (3)$$

wherein R, M and X are as defined hereinabove with relation to Equation 1. One method for preparing a mixture of organometallic halides as set forth in Equation 3 comprises reacting an organic halide with aluminum, gallium, indium or thallium at atmospheric pressure with the reaction being effected in an inert atmosphere, such as nitrogen. Satisfactory operation is accomplished by introducing the organic halide below the surface of the reaction mixture. This method of introduction of the organic halide is of particular significance when it is a gas at the temperature of the reaction. In such instances, it is advantageous to use a portion of the liquid product of reaction from a previous run or a hydrocarbon as a medium for the reaction, especially during the initial stages of the run. This liquid material is charged to the reactor along with the metal, and the reactor contents are then heated to the desired temperature, generally in the range between 100 and 200° C. Thereafter, the organic halide is introduced below the surface of the liquid material at such a rate that the temperature is maintained at the desired level. Addition of the organic halide is terminated when there is no further evidence of reaction, i.e., when a drop in temperature occurs. The organometallic dihalide in admixture with the monohalide recovered as the product of the reaction may be stored in an inert atmosphere or immediately used in the process of this invention to produce the organomonohalide. When a mixture of the organometallic dihalide and monohalide are so utilized, the monohalide contained in the mixture does not enter into the reaction but merely constitutes a part of the product recovered from the reaction. The organometallic dihalide contained in the mixture of the dihalide and monohalide can also be separated by any convenient means, such as by distillation, after which the dihalide can be used as the starting material in the process of this invention.

When preparing organometallic monohalides in accordance with this invention, a reactor is conveniently employed which is provided with a stirrer, a suitable condensing system through which off gases are allowed to pass, an inlet tube for an inert gas, such as nitrogen, an induction tube attached to the bottom of the reactor for introduction of the organic halide, and a means for registering temperature. The reactor is purged with purified nitrogen which is thereafter passed slowly through the system throughout the reaction. One of the metals selected from the group consisting of alkali metals, magnesium, calcium and zinc is charged to the reactor together with an organometallic dihalide. The organometallic dihalide may contain some of the monohalide, but it is to be understood that this latter material does not enter into the reaction. The metal added to the reactor may be dispersed in a suitable hydrocarbon as described hereinbefore. The reactor contents are stirred and heated to a temperature in the range of 100 to 200° C., preferably between 120 and 180° C., after which the organic halide is introduced below the surface of the reaction mixture. Stirring is continued with the organic halide being introduced at such a rate that flooding of the condenser does not occur and the pot temperature remains within the aforementioned temperature ranges. The addition of the organic halide is terminated when it ceases to be consumed as evidenced by a drop in the reaction temperature. The organometallic monohalide is then separated from the reaction mixture by any suitable means, such as by distillation. The process may be carried out at atmospheric pressure or, if desired, superatmospheric pressures may be employed. However, the pressures utilized do not generally exceed from 300 to 400 p.s.i.g.

In carrying out the above-described process, optimum results are obtained when using two mols of alkali metal per mol of halide ion or one mol of calcium, magnesium or zinc per mol of halide ion in the reaction mixture. Less than this amount of metal will result in the formation of somewhat less than the theoretical amount of the monohalide product, and an excess of the metal will react with the monohalide, thereby reducing the ultimate yield. Although it is preferred to use the theoretical amount of metal, from 90 to 110 percent of the theoretical amount can be employed while still obtaining reasonably good yields.

It is important when carrying out the process of this invention that no extraneous materials which will retard or inhibit the reaction be present in the organic halide or the metal. In this regard such materials as carbon dioxide, oxygen and moisture should be excluded from the system. Higher yields of product are obtainable when these precautions are observed.

As previously indicated, the organometallic dihalides and monohalides with which this invention is concerned may be represented by the formulas $RMX_2$ and $R_2MX$, respectively, wherein R, M and X are as defined hereinabove. The hydrocarbon radicals generally do not contain more than 20 carbon atoms each, and radicals having 10 carbon atoms or less are preferred. The compounds of greatest interest are the alkylaluminum monohalides, particularly those in which the alkyl groups contain not more than eight carbon atoms each. Specific examples of organometallic dihalides which can be converted to the corresponding monohalides in accordance with this invention are the following: $CH_3AlCl_2$, $C_2H_5AlCl_2$, $C_4H_9AlBr_2$, $C_8H_{17}AlI_2$, $C_3H_7GaF_2$,

(cyclohexane derivative), $C_6H_5GaBr_2$ (benzene derivative), $C_{20}H_{41}GaBr_2$, $C_{14}H_{29}GaF_2$, $C_6H_5InCl_2$ (benzene derivative), $C_8H_{17}InF_2$, $C_6H_{11}InBr_2$ (cyclohexane derivative), 3-methylcyclohexylaluminum dichloride, 2-cyclohexylethylgallium dichloride, p-tolylindium difluoride, 3-phenyl-1-methylpropylthallium dibromide, 2 - (3-isopropylcyclohexyl)ethylaluminum diodide, and the like.

A more comprehensive understanding of the invention may be obtained by referring to the following illustrative example, which is not intended, however, to be unduly limitative of the invention.

*Example*

A glass reactor, which had been purged with purified nitrogen, was charged with 310 grams of aluminum turnings and 200 cubic centimeters of a liquid reaction product of aluminum and ethyl chloride, obtained from a previous run. The reactor was provided with a stirrer, a condenser through which acetone cooled to Dry Ice temperature was circulated, an inlet tube for introducing nitrogen, an induction tube to the bottom of the flask for introduction of ethyl chloride, and a thermocouple well. Nitrogen was kept flowing through the system at a slow rate in order to maintain an inert atmosphere in the reactor. The reactor contents were stirred and heated to 120° C. Ethyl chloride was then introduced over a 20-hour period at such a rate that the condenser did not flood and the temperature was maintained at least as high as 120° C. During the last four hours, the temperature was increased to 190° C. Addition of ethyl chloride was discontinued when no more of it appeared to be consumed, as evidenced by a drop in temperature.

The product was removed from the reactor while keeping it protected with an atmosphere of nitrogen and then distilled. It had a boiling point of 74–76° C. at a pressure of 4.5 mm. of mercury. Analysis for chlorine gave a value of 52.7 weight percent, which indicated that the product was predominantly ethylaluminum dichloride. The theoretical chlorine content for ethylaluminum dichloride ($C_2H_5AlCl_2$) is 56.0 weight percent.

Six hundred thirty-three grams of the product described above, obtained by reacting ethyl chloride with aluminum, was charged to a reactor together with 105 grams of 70–80 mesh magnesium. The reactor utilized was the same as the one described above. It was purged with nitrogen prior to charging the reactants, and a slow flow of nitrogen was maintained through the system during the reaction. The mixture was stirred and heated to 120° C., after which ethyl chloride was introduced through an induction tube which reached below the surface of the reaction mixture. Addition of ethyl chloride was continued for 6 hours while the temperature was maintained between 110 and 120° C. The temperature was then increased to 180° C. for an additional 3-hour period. The total amount of ethyl chloride absorbed was 201 grams.

Two hundred cubic centimeters of hexadecane was added to the reaction mixture to aid in separation of the diethylaluminum chloride, i.e., it served as a "chaser." The product obtained upon distillation at 76–78° C. and a pressure of 5.6 mm. of mercury had a chlorine content of 33.4 weight percent. The theoretical chlorine content for diethylaluminum chloride is 29.4 weight percent. It is thus apparent that the product recovered was predominantly diethylaluminum chloride.

It will be evident to those skilled in the art that variations and modifications of the invention can be made upon study of the foregoing disclosure. Such variations and modifications are believed to be clearly within the spirit and scope of the invention.

We claim:
1. A process for the preparation of an organometallic monohalide corresponding to the formula $R_2MX$, wherein R is a member selected from the group consisting of an alkyl radical, a cycloalkyl radical, an aryl radical and combinations of these radicals, M is a metal selected from the group consisting of aluminum, gallium, indium and thallium, and X is a halogen, which comprises contacting an organometallic dihalide, corresponding to the formula $RMX_2$, with a metal selected from the group consisting of alkali metals, magnesium, calcium and zinc in the presence of an organic halide corresponding to the formula RX, wherein R, M and X are as defined above.

2. A process for the preparation of an organometallic monohalide corresponding to the formula $R_2MX$ wherein R is a member selected from the group consisting of an alkyl radical, a cycloalkyl radical, an aryl radical and combinations of these radicals, M is a metal selected from the group consisting of aluminum, gallium, indium and thallium, and X is a halogen, which comprises contacting an organometallic dihalide, corresponding to the formula $RMX_2$, with a metal selected from the group consisting of alkali metals, magnesium, calcium and zinc in the presence of an organic halide corresponding to the formula RX, wherein R, M and X are as defined above; and separating from the resulting reaction mixture an organometallic monohalide corresponding to the formula $R_2MX$.

3. The process of claim 2 wherein said metal is an alkali metal.

4. The process of claim 3 wherein said alkali metal is sodium.

5. The process of claim 2 wherein said metal is magnesium.

6. A process for the preparation of an organometallic monohalide corresponding to the formula $R_2MX$, wherein R is a member selected from the group consisting of an alkyl radical, a cycloalkyl radical, an aryl radical and combinations of these radicals, M is a metal selected from the group consisting of aluminum, gallium, indium and thallium and X is a halogen, which comprises introducing into a reaction zone an organometallic dihalide corresponding to the formula $RMX_2$, wherein R, M and X are as defined above, and a metal selected from the group consisting of alkali metals, magnesium, calcium and zinc; introducing an organic halide corresponding to the formula RX, wherein R and X are as defined above, into said reaction zone below the surface of the reaction mixture therein; withdrawing reaction mixture from said reaction zone; and separating from said withdrawn reaction mixture an organometallic monohalide corresponding to the formula $R_2MX$.

7. The process of claim 6 wherein said metal is dispersed in a hydrocarbon, liquid and inert under conditions of the process.

8. The process of claim 7 wherein said metal is an alkali metal.

9. The process of claim 8 wherein said alkali metal is sodium.

10. The process of claim 7 wherein said metal is magnesium.

11. A process for the preparation of an alkylaluminum monohalide which comprises contacting an alkylaluminum dihalide with a metal selected from the group consisting of alkali metals, calcium, magnesium and zinc in the presence of an alkali halide.

12. The process of claim 11 wherein methylaluminum dichloride is contacted with one of said metals in the presence of methyl chloride and dimethylaluminum chloride is recovered as the product of the process.

13. The process of claim 11 wherein ethylaluminum dichloride is contacted with one of said metals in the presence of ethyl chloride and diethylaluminum chloride is recovered as the product of the process.

14. The process of claim 11 wherein ethylaluminum dibromide is contacted with one of said metals in the presence of ethyl bromide and diethylaluminum bromide is recovered as the product of the process.

15. The process of claim 11 wherein butylaluminum chloride is contacted with one of said metals in the presence of butyl chloride and dibutylaluminum chloride is recovered as the product of the process.

16. The process of claim 11 wherein butylaluminum bromide is contacted with one of said metals in the presence of butyl bromide and dibutylaluminum bromide is recovered as the product of the process.

17. A process for the preparation of an organometallic monohalide corresponding to the formula $R_2MX$, wherein R is a member selected from the group consisting of an alkyl radical, a cycloalkyl radical, an aryl radical and combinations of these radicals, M is a metal selected from the group consisting of aluminum, gallium, indium and thallium, and X is a halogen, which comprises introducing into a reaction zone an organometallic halide corresponding to the formula $RMX_2$, where R, M and X are as defined above, and a metal selected from the group consisting of alkali metals, magnesium, calcium and zinc; heating the contents of said reaction zone to a temperature in the range of 100 to 200° C.; introducing an organic halide corresponding to the formula RX, wherein R and X are as defined above, into said reaction zone below the surface of the reaction mixture therein; withdrawing reaction mixture from said reaction zone; and separating from said withdrawn reaction mixture an organometallic monohalide corresponding to the formula $R_2MX$.

18. The process of claim 17 wherein said organic halide is introduced at such a rate that the temperature of the reaction mixture is maintained in said temperature range and the introduction of said organic halide is terminated when a substantial drop in said temperature occurs.

References Cited in the file of this patent

UNITED STATES PATENTS

| | | |
|---|---|---|
| 2,691,668 | Ziegler et al. | Oct. 12, 1954 |
| 2,744,127 | Ziegler et al. | May 1, 1956 |

FOREIGN PATENTS

| | | |
|---|---|---|
| 911,731 | Germany | May 17, 1954 |

OTHER REFERENCES

Grosse et al.: Journ. Org. Chem., vol. 5 (1940), page 110.

Hansley: I. & E. Chem., vol. 43, No. 8 (1951), pages 1759–60.

UNITED STATES PATENT OFFICE
CERTIFICATE OF CORRECTION

Patent No. 3,082,232                          March 19, 1963

Gene Nowlin et al.

It is hereby certified that error appears in the above numbered patent requiring correction and that the said Letters Patent should read as corrected below.

Column 5, line 47, for "alkali" read -- alkyl --.

Signed and sealed this 5th day of November 1963.

(SEAL)
Attest:

ERNEST W. SWIDER

Attesting Officer

EDWIN L. REYNOLDS

Acting Commissioner of Patents